(12) United States Patent
Fang et al.

(10) Patent No.: US 12,061,531 B2
(45) Date of Patent: Aug. 13, 2024

(54) INSIGHT-LED ACTIVITY REPORTING AND DIGITAL HEALTH MANAGEMENT

(71) Applicant: Microsoft Technology Licensing, LLC, Redmond, WA (US)

(72) Inventors: Richard Fang, Belevue, WA (US); Chang-Ling Wu, Seattle, WA (US); Justin James Wagle, Pacifica, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 476 days.

(21) Appl. No.: 17/347,907

(22) Filed: Jun. 15, 2021

(65) Prior Publication Data
US 2022/0398181 A1    Dec. 15, 2022

(51) Int. Cl.
| | |
|---|---|
| *G06F 11/34* | (2006.01) |
| *G06N 20/00* | (2019.01) |
| *G08B 21/04* | (2006.01) |
| *G08B 21/18* | (2006.01) |

(52) U.S. Cl.
CPC ......... *G06F 11/3438* (2013.01); *G06N 20/00* (2019.01); *G08B 21/0423* (2013.01); *G08B 21/182* (2013.01)

(58) Field of Classification Search
CPC . G06F 11/3438; G06N 20/00; G08B 21/0423; G08B 21/182
See application file for complete search history.

(56) References Cited

U.S. PATENT DOCUMENTS

| | | | |
|---|---|---|---|
| 9,485,206 B2 | 11/2016 | Day et al. | |
| 10,043,366 B2 | 8/2018 | Gorzela et al. | |
| 10,609,208 B2 | 3/2020 | Skogen et al. | |
| 10,872,024 B2 | 12/2020 | Cranfill et al. | |
| 2013/0216989 A1* | 8/2013 | Cuthbert | A61B 5/1113 434/238 |
| 2016/0335405 A1 | 11/2016 | Perunov et al. | |

FOREIGN PATENT DOCUMENTS

WO    2019237332 A1    12/2019

OTHER PUBLICATIONS

Stutzman, Fred, "An API for Digital Wellbeing", Retrieved from: https://medium.com/@fstutzman/an-api-for-digital-wellbeing-2211cde3e01a, Sep. 19, 2018, 14 Pages.

* cited by examiner

*Primary Examiner* — Walter L Lindsay, Jr.
*Assistant Examiner* — Geoffrey T Evans
(74) *Attorney, Agent, or Firm* — RAY QUINNEY & NEBEKER; Tiffany Healy (57) ABSTRACT

The systems and methods may use machine learning models to process device data of user devices and determine device usage behaviors for the users of the user devices based on the device data. The systems and methods may provide relatable insights for the device usage behaviors in a user-friendly manner. The systems and methods may provide actional recommendations that users may take in response to the insights provided to promote healthy device usage behaviors or to prevent or reduce the device usage behavior. The systems and methods may also provide recommendations with access to information or other content related to the device usage behavior.

16 Claims, 7 Drawing Sheets

INSIGHT-LED ACTIVITY REPORTING AND DIGITAL HEALTH MANAGEMENT

BACKGROUND

Parents who have children generally want to develop healthy digital habits for their children when using electronic devices. For example, parents may want to monitor screen time usage, potentially harmful behavior, and/or potentially harmful content for children. The status-quo today requires parents to draw from their own intuition for monitoring device usage by children or personal experience which is rather unreliable. Alternatively, parents may spend lots of time researching for themselves statistics about screen time for children but still require keen data-scientist eyes to spot what is relevant to their situation.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method. The method may include determining a device usage behavior of a user of the user device by using a machine learning model that receives device data and determines the device usage behavior based on the device data, wherein the device usage behavior indicates device usage habits or device usage patterns of the user. The method may include generating, by the machine learning model, at least one insight for the device usage behavior that indicates a healthy device usage habit of the user or an unhealthy device usage habit of the user. The method may include providing one or more recommendations for the at least one insight to promote healthy device usage behavior.

Another example implementation relates to a method. The method may include determining a device usage behavior of a user of the user device by using a machine learning model that receives device data and determines the device usage behavior based on the device data, wherein the device usage behavior indicates device usage habits or device usage patterns of the user. The method may include generating, by the machine learning model, at least one insight for the device usage behavior that indicates an abnormality in the device usage behavior of the user relating to educational usage of the user device. The method may include providing one or more recommendations for the at least one insight, wherein the one or more recommendations include an action based on the at least one insight.

Another example implementation relates to a system. The system may include one or more processors; memory in electronic communication with the one or more processors; and instructions stored in the memory, the instructions executable by the one or more processors to: train, at a server, a device model using aggregated device data received from a plurality of user devices in the system; and provide the device model to the plurality of user devices, wherein each device model operating on a user device of the plurality of user devices is operable to: determine a device usage behavior of a user of the user device based on the device data of the user device, wherein the device usage behavior indicates device usage habits or device usage patterns of the user; generate at least one insights for the device usage behaviors; and provide one or more recommendations for the at least one insight.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to device usage activity reporting and management. Parents who have children generally want to develop healthy digital habits for their children when using electronic devices in a technology centric world. For example, parents may want to monitor screen time usage, potentially harmful behavior, and/or potentially harmful content for children. The status-quo today requires parents to draw from their own intuition for monitoring device usage by children or personal experience which is rather unreliable. A parent might happen to recall a conversation with the neighbor about how much self-reported screen time the neighbor's child gets. But the neighbor's kid is a few grades older, and it may be difficult for parents to determine whether the amount of screen time usage by the neighbor's kid is a good bar for an amount of screen time usage for the parent's kids. Alternatively, parents may spend lots of time researching for themselves statistics about screen time for children but still require keen data-scientist eyes to spot what is relevant to their situation.

Currently, parents may receive a wholistic view of online and device usage habits. For example, parents receive activity reporting on online and device usage habits (how much time spent on the devices, devices used, applications used, websites visited, search activities). In addition, parents may use parental controls, content restrictions, and/or screen time limits to restrict access to content or devices.

The information currently provided in the activity reporting may be a raw set of data. The raw set of data may provide the facts about online and device usage but may not help the parents in identifying whether the usage is too much or problematic. For example, a person may be told that "there are 70,000 salmon in Lake Washington!" The data provided about the salmon does not provide any information on whether that is too many salmon, too few salmon, just a right number of salmon, or if something needs to be done about the number of fish in Lake Washington Parents face the same issue when receiving the raw set of data with activity reporting for the online and device usage. If the activity reporting indicates that a child played two hours of games today, parents do not know whether that is healthy behavior or unhealthy behavior. Moreover, parents are unaware if two hours of game play is worrisome or warrants action. Parents are also unaware of how two hours of game play compares to other device usage by children. As such, parents spend lots of time performing independent research (reading books, reading articles, reading blogs, consulting experts, talking to other parents) searching for statistics about screen time for children, what actions may need to be taken, what content may be preferable for children, and/or popular applications or content for children.

The present disclosure includes methods and system that use crowd sourced data from users' devices of the system that is inaccessible to other users of the system or data that is too cumbersome for individuals to compile to provide relatable insights and actionable recommendations based on the data. The methods and systems may use machine learning models to process the data for meaningful insights about the data put into relative terms of the users. The insights may be based on device usage behaviors of the users learned by the machine learning models. In some implementations, machine learning models on the device process the device data and/or other data received from a server to generate the insights and/or recommendations. In some implementations, machine learning models on the server process the device data and/or other data received to generate the insights and/or recommendations.

The insights may identify screen time usage by a user or an amount of time a user used specific applications. The insights may also identify healthy device usage behaviors (e.g., a child's screen time access is within a recommended screen time amount by the pediatric association). The insights may also identify abnormalities in device usage behaviors. The insights may also identify unhealthy device usage habits (e.g., a young child regularly playing games late at night after a recommended bedtime for the child's age range). The insights may also detect device usage swapping (e.g., a child gave up spending time on educational applications where a class may not be engaging the child academically for entertainment usage on the device). The insights may handle exceptions to the device usage behavior (e.g., seasonality and location-based exceptions for vacations or holidays). As such, the methods and systems may identify any number of insights based on the learned device usage behavior of users of the devices.

The recommendations may include actions users may take based on the insights. The recommendations may also include information or content related to the insights (e.g., articles to improve the device usage behaviors or videos related the device usage behaviors). An example action may include viewing a summary of past due or upcoming assignments for a child based on an insight identifying an abnormality in educational usage of the device or usage swapping with educational applications or educational tasks. The recommendations may also provide additional content related to the insights (e.g., suggested articles from respected sources or a video to watch about the device usage behaviors). The methods and systems may provide a combination of recommendations to the users based on the insights generated.

The methods and systems may maintain the data privacy of the users of the system. The methods and system may apply different techniques to ensure that the data is used in an abstracted manner so that specifics of the users are unavailable in the data when generating the insights and/or recommendations.

One technical improvement of the present disclosure is distributing the compute to the user devices in the system so that machine learning models on the user devices process the device data and/or other data received from a server to generate the insights and/or recommendations. Distributing the compute to the user device results in reduced compute costs at servers of the system. In addition, by distributing the compute to the user devices, data privacy of the users may be maintained by performing the processing on the device data locally on the user devices without having the device data leave the user devices.

As such, the present disclosure provides a service to users of a system to process device usage behaviors from a large amount of data accessible by the system and to provide insights for the device usage behavior in a human relatable manner. The methods and systems may easily recognize and analyze patterns in the large volume of data. In addition, the present disclosure provides actionable recommendations that the users may take in response to the insights provided.

Figure 1:
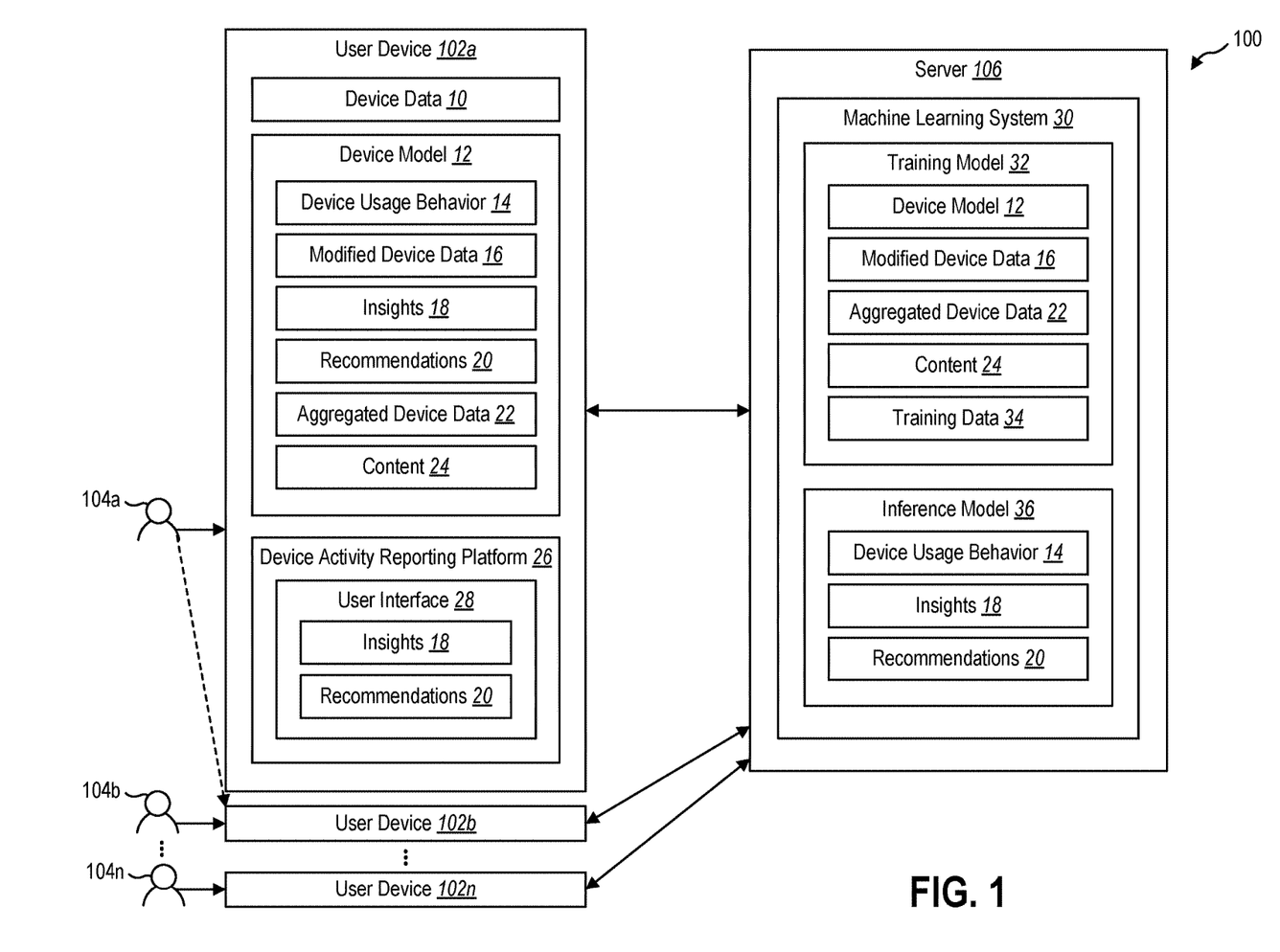
FIG. 1 illustrates an example system for identifying insights and recommendations for device usage behaviors in accordance with implementations of the present disclosure.

Referring now to FIG. 1, illustrated is an example system 100 for use with activity reporting and device management of one or more user devices. System 100 may be implemented by a cloud service provider. System 100 may include one or more user devices 102a, 102b up to n (where n is a positive integer) in communication with one or more servers 106 via a network. The network may include one or multiple networks that use one or more communication platforms or technologies for transmitting data. For example, the network may include the internet or other data link that enables transport of electronic data between respective devices of the system 100.

One or more users 104a, 104b up to m (where m is a positive integer) may access the user devices 102a, 102b. The users 104a, 104b may access the same user device 102a, 102b or may access different user devices 102a, 102b. In some implementations the user 104a is a parent, or other individuals that supervise children, and the user 104b is a child.

The user devices 102a, 102b may include device data 10. The device data 10 may include, but is not limited to, device settings, applications downloaded on the device, application usage information (e.g., length of time the application is used, which applications are used), internet search history, device location information, audio captured by the device, time information, and/or date information. The device data 10 may be continuously updated based on access to the user devices 102a, 102b by the users 104a, 104b or actions taken by the users 104a, 104b.

The user devices 102a, 102b may include a device model 12 operating on the user devices 102a, 102b. The device model 12 accesses the device data 10 and may determine device usage behaviors 14 for the users 104a, 104b based on the device data 10. The device usage behaviors 14 may indicate device usage trends, device usage habits, device usage location, and/or device usage patterns of the users 104a, 104b. Examples of device usage behaviors 14 include, but are not limited to, screen time usage, an amount of time a specific application is used, patterns when the device usage occurs, patterns in application usage, search history, using the device in a same location, changing a location where the device is used, healthy device usage habits, and/or unhealthy device usage habits.

The device model 12 may be a trained machine learning model provided to the user devices 102a, 102b by the server 106. In some implementations, the device model 12 predicts a next action of the users 104a, 104b in a time series for the device usage behaviors 14. In some implementations, the device model 12 classifies the actions of the users 104a, 104b in determining the device usage behaviors 14. In some implementations, the device model 12 identifies one or more patterns in actions by the users 104a, 104b in determining the device usage behaviors 14.

The device model 12 generates modified device data 16 based on the device data 10 accessed by the device model 12 and/or one or more device usage behaviors 14 determined by the device model 12. The modified device data 16 is transmitted to the server 106 for further processing. The modified device data 16 may be outputted by the device model 12 in response to the processing performed by the device model 12 on the device data 10. The modified device data 16 may be a subset of the device data 10.

In some implementations, the modified device data 16 is a weight matrix of the device data 10 generated by the device model 12 (e.g., a summary of the device data 10). For example, the weight matrix may indicate a similarity of the device data 10 and/or the device usage behaviors 14. In some implementations, the modified device data 16 is encrypted. In some implementations, any user identification information is removed from the modified device data 16 to preserve the data privacy of the users 104a, 104b prior to sending the modified device data 16 to the server 106.

The server 106 may include a machine learning system 30 with multiple machine learning models that receive the modified device data 16 from the user devices 102a, 102b and train the device models 12. The machine learning system 30 includes a training model 32 that trains the device models 12 and provides the device models 12 to the user devices 102a, 102b. In some implementations, the training model 32 uses federated learning to train the device models 12 and distribute the device models 12 to the user devices 102a, 102b to so that the user devices 102a, 102b perform the processing of the device data 10 locally on the user devices 102a, 102b. As such, the device models 12 may execute locally on the user devices 102a, 102b without having to exchange the device data 10 with the servers 106.

The training model 32 may receive the modified device data 16 from a plurality of user devices 102a, 102b in the system 100. The training model 32 may generate aggregated device data 22 for the modified device data 16 received from the user devices 102a, 102b in the system 100. The aggregated device data 22 may be an average, mean, or median of the modified device data 16. In addition, the aggregated device data 22 may identify patterns or trends in the modified device data 16. The aggregated device data 22 may be classified into different groups or cohorts of users. As such, the aggregated device data 22 combines the learnings from the different device models 12 executing on different user devices 102a, 102b of the system 100 into a single information source.

The training model 32 may receive, or otherwise access, content available to the server 106. The content may include, but is not limited to, articles, videos, webpages, and/or vendor information (application data, webpage data, etc.). The content may be used to determine similarities or patterns in the modified device data 16 or the aggregated device data 22 by comparing the modified device data 16 or the aggregated device data 22 with the content. The training model 32 may identify a subset of content 24 that is relevant or similar to the modified device data 16 or the aggregated device data 22.

In some implementations, the training model 32 may use categories and/or labels of the content to determine similarities between the content and the modified device data 16 or the aggregated device data 22 to identify relevant content for the modified device data 16 or the aggregated device data 22. For example, the training model 32 may mine the articles or content that discuss the topics related to the activities or application categories (e.g., entertainment, gaming, health, and/or wellness) that the users engage with as identified by the modified device data 16 or the aggregated device data 22. The training model 32 may use vendor provided information for the applications or content to determine the related topics. The training model 32 may identify the best article to recommend to the users by organizing the articles or content by activities and/or application categories that the users engage with. The training model 32 may also organize the articles and/or content by time of day, unhealthy habits, and/or healthy habits. In some implementations, the training model 32 may use reinforcement learning based on the aggregated device data 22 to determine the subset of content 24 to deliver to the user devices 102a, 102b or to use in further processing of the modified device data 16 or the aggregated device data 22.

The training model 32 may use the modified device data 16, the aggregated device data 22 and/or the content 24 to generate training data 34 for the device models 12. The training model 32 may update the device models 12 based on the training data 34 and may transmit the updated device models 12 to the user devices 102a, 102b. As such, the device models 12 may be updated by the server 106 based on new modified device data 16 learned by the device models 12 of users through the system 100.

The device model 12 may generate one or more insights 18 and/or recommendations 20 for the device usage behaviors 14. The insights 18 may provide a deep level of understanding that facilitates the users 104a, 104b to either conclude with satisfaction or identify the issue(s) in the device usage behaviors 14 as compared to providing the users 104a, 104b with just data, which may require the users 104a, 104b to perform further research, calculations, and/or comparisons for the data to be useful. The insights 18 may highlight or summarize the device usage behaviors 14 in a relatable manner so that the users 104a, 104b may easily identify the device usage behaviors 14 and/or easily digest information from the device usage behaviors 14. The insights 18 may highlight healthy device usage behaviors 14. The insights 18 may highlight device usage behaviors 14 that are possibly problematic. The insights 18 may also identify new device usage behaviors 14. The insights 18 may also highlight changes or deviations from typical device usage behaviors 14. In addition, the insights 18 may identify patterns in the device usage behaviors 14.

The recommendations 20 may provide an action for the users 104a, 104b to take based on the insights 18. The recommendations 20 may also provide additional information to the users 104a, 104b related to the insights 18. The recommendations 20 provided may be for improving a behavior (e.g., improving game play or spending more time outside instead of playing games). The recommendations 20 provided may also be for enforcement or restrictions (e.g., actions to take to prevent screen time access or reduce screen time access). As such, the recommendations 20 and/or suggested actions may differ based on the insights 18 generated.

The device model 12 may receive aggregated device data 22 from the server 106 to use in making the insights 18 and/or the recommendations 20. The aggregated device data 22 may be device data received at the server 106 from other users of the system 100 that is typically inaccessible to the users 104a, 104b. The server 106 maintains the data privacy of the users 104a, 104b of the system 100 by providing the aggregated data 22 in an abstracted manner without any user identification information. In some implementations, the server 106 uses differential privacy to maintain the data privacy of the users 104a, 104b.

The device model 12 may process the aggregated device data 22 and compare the device usage behaviors 14 to the aggregated device data 22 to provide meaningful insights 18 and/or recommendations 20 put in relative terms of the users 104a, 104b. In some implementations, the device model 12 uses similarity vectors in the comparison between the aggregated device data 22 and the device usage behaviors 14 in determining the insights 18 and/or the recommendations 20. In some implementations, the device model 12 uses reinforcement learning to determine the insights 18 and/or a next action for the users 104a, 104b to take or which information may be beneficial for the users 104a, 104b.

The device model 12 may receive additional content 24 from the server 106 to use in making the insights 18 and/or the recommendations 20. The additional content 24 may include, but is not limited to, articles, videos, webpages, and/or vendor information. The additional content 24 may be a curated set or subset of information or content that is relevant to the device usage behaviors 14. The device model 12 may process the additional content 24 and compare the device usage behaviors 14 to the additional content 24 to provide insights 18 and/or identify relevant content to provide in the recommendations 20. The relevant content may be based on similarities identified by the device model 12 and/or the training model 32 in the additional content 24 and the device usage behaviors 14.

An example insight 18 from the device usage behavior 14 includes screen time usage of a user 104a, 104b. For example, the insight 18 may indicate that a child is regularly playing a game application on the user device 102a, 102b for an hour in the afternoon each day. In addition, the insight 18 may identify that the game play by the child is a new device usage behavior 14. The device model 12 may also provide a recommendation 20 with access to articles or information on improving your gaming based on the insight 18 generated.

The insight 18 may also indicate that a child's screen time usage is 260% higher as compared to the national average of screen time usage by a child or is in the $95^{th}$ percentile among kids the same age as the child. The insights 18 may be relative to any average (national or local). The insights 18 may automatically scale to more local levels (state, county, town, zip code or any geographic region) that have enough data collected in the system (e.g., over a threshold level) to generate an average for the local level. The device model 12 may also generate a recommendation 20 based on the insight 18 with a screen time template that the user 104a, 104b may subscribe to for preventing access on the child's device and/or for reducing the amount of screen time on the child's device. The screen time template may be based on the pediatric association recommendations to limit screen access for children to a specific amount. The users 104a, 104b may be able to automatically subscribe to the recommended action for the generated insights 18.

Demographics may be another way to offer more relevant, relatable, actionable insights 18 to the users 104a, 104b of the system 100. The insights 18 may be based on similar demographics of the users 104a, 104b of the system 100 (e.g., two full-time working parents, single parents, income level, and/or disabilities). For example, if the user 104a, 104b is a single parent, the user 104a, 104b may select single parent households in the same town as the comparison for the insights 18. The children of a single parent may spend more time in front of screens so it may be more useful to a single parent user to know how the user's family compares relative to other single parent families in the same town instead of the national average. The demographics selected for comparisons to the device usage behaviors 14 may be automatically suggested by the system 100 or selected by the users 104a, 104b of the system 100.

Another example insight 18 includes identifying healthy device usage behaviors 14. The device model 12 may identify that a child recently started playing games for thirty minutes a day. The device model 12 may compare the game playing to a threshold level. The threshold level may include a recommended amount of screen time for a child (e.g., from a reputable organization, such as, the pediatric association). The threshold level may include an average amount of screen time for game playing. The threshold level may be based on any average (national or local). The threshold level may also be based on demographics of the child or the child's family. The device model 12 may generate an insight 18 notifying the parents that the game play is healthy device usage behavior in response to the game playing being below the threshold level (e.g., the game playing is within a recommended amount of screen time by the pediatric association). The insight 18 may include the amount time the child plays the game, the recommended screen time, and an amount the game playing is under the recommended screen time amount. In addition, the device model 12 may provide a recommendation 20 that includes sources or articles to improve gaming skills.

Another example insight 18 includes automatic identifications of abnormalities in the device usage behaviors 14. The device model 12 may identify patterns in the device usage behaviors 14 and may analyze divergences from the patterns. For example, in general the device model 12 may determine that a child averages five hours per week on education applications (e.g., assigned by teacher, or general educational related activities) on the user device 102a, 102b.

The device model 12 may determine that this week the child spent thirty minutes on education applications, which is a significant drop in education usage of the user device 102a, 102b as compared to the usual pattern of the device usage behavior 14. The device model 12 may generate an insight 18 notifying the parents or other users (e.g., teachers or school administrators) that an abnormality in device usage behavior 14 occurred this week for the child. The device model 12 may provide a recommendation 20 that automatically connects the parent or other users to a summary view of the child's educational assignments status (past due assignments or upcoming assignments) in response to the detected abnormality in educational device usage. The recommendations 20 and/or suggested actions may differ based on the changes in device usage behaviors 14 or the abnormalities detected in the device usage behaviors 14.

The device model 12 may recognize patterns in device usage behaviors 14 by using recent device usage (e.g., the child's most recent three week usage is consistently above five hours per week on educational tasks) and may use the patterns to determine whether an abnormality occurred in the device usage behaviors 14 or a change occurred in the device usage behaviors 14. The device model 12 may determine whether a consistent behavior or pattern may be observed for the device usage behavior 14 for a time period (e.g., the device usage over a period of days or weeks). The device usage model 12 may identify when device usage changes by a standard deviation (e.g., this week, the usage fell to zero) from the learned device usage behavior 14 pattern. An insight 18 may be generated automatically based on the change in device usage behaviors 14.

The device model 12 may handle exceptions to remove unwanted false alarms for changes in device usage behaviors 14. For example, the device model 12 may take into account seasonal changes and/or vacations to explain the changes in device usage behavior 14. The device model 12 may compare the change in device usage patterns with other kids in this age group in nearby zip codes to filter out spring break or other school holidays to prevent a false abnormality since all kids are spending less time on educational applications or increasing entertainment screen time usage due to the school holiday.

Another example may include using device location to determine whether an exception may explain the change in device usage behavior 14. For example, if the device usage location is detected outside of the usual local geo-fence region where the user 104a, 104b usually uses the device, the device model 12 may infer that the user 104a, 104b is travelling or on vacation and that may explain the changes in device usage behavior 14.

Another example insight 18 includes indicating that the user 104a, 104b may be distracted and is usage swapping (e.g., a change in activity or behavior for another usage). The device model 12 may detect whether usage swapping is occurring and may provide a reason for the usage swapping in the insight 18. For example, the device usage behavior 14 indicated that the child gave up spending time on educational tasks for entertainment related usage of the user device 102a, 102b (e.g., playing more games, watching more videos). Detecting usage swapping may help identify what is occurring with the device usage so that the parent or other individuals may take correct actions or change conversations based on the insights 18 provided. For example, the device model 12 may determine that the reason for the usage swapping is distraction from a class or class assignment and the insights 18 may include distraction as a reason for the usage swapping. Another example includes the device model 12 determining that this is an isolated reduction in educational usage where a class may not be engaging the child academically. The device model 12 may generate an insight 18 indicating that the child may be disengaged from a class or class assignment as the reason for the usage swapping.

Another example insight 18 includes identifying heavy usage of a specific application during mealtimes or other time frames based on the device usage behaviors 14. For example, the device model 12 may determine that heavy usage of a social media application occurs during dinner time. The device model 12 may provide a pause screen time recommendation to the users 104a, 104b that temporarily pauses device screen time during a time frame. Pausing the device screen time may help a family enjoy the moment together instead of having the family members actively on a user device 102a, 102b during the meal.

The device model 12 may learn when mealtimes occur by identifying specific activities related to mealtimes. For example, the device model 12 may use indoor proximity with family devices (GPS location within geo-area of single dwelling, map precise spaces and relative location of family's devices with accelerometer data, Bluetooth/Wi-Fi reach and strength between devices to indicate that the devices are all together) to identify activities related to mealtimes. The device model 12 may also use internet of things (IoT) connected devices (e.g., when fridge gets opened multiples, oven is turned on, dining room light just got turned on, water usage spikes) to determine activities related to mealtimes. The device model 12 may use delivery transactions (Uber Eats delivery arrival events) to determine activities related to mealtimes. The device model 12 may also use device audio detection (silverware/dinnerware noises, keywords "dinner time", chewing noises, chewing/garbled speech) to determine activities related to mealtimes. The device model 12 may also monitor the usage of parents' devices indicating a lull or downtime around dinner hours to determine activities related to mealtime. The device model 12 may take the aggregated device data 22 from across a large sampling of families in the region to piece together a heat map of most likely mealtimes. The device model 12 may determine if there is a general pattern for potential mealtime in the aggregated device data 22. The pattern of when mealtimes may occur may be across different cultures, different religions, different geographic regions, and/or different demographics of individuals the system 100.

Another example insight 18 includes identifying unhealthy device usage habits detected by the device model 12. The device model 12 may identify device usage behaviors 14 that may be unhealthy for the users 104a, 104b of the system 100. For example, the device model 12 may determine an insight 18 that an eight year old regularly plays games on a device close to midnight. The device model 12 may provide a recommendation 20 with access to suggested articles from respected sources on benefits of healthy bedtime and strong bedtime routines. Another example includes the device model 12 determines an insight 18 that that a child is playing games for a long period of time during the day (e.g., six hours a day). The device model 12 may provide a recommendation 20 with access to articles or information on finding fun outdoor activities you can do with friends and family. Another example includes the device model 12 determines an insight 18 that the child regularly completes educational tasks late at night. The device model 12 may provide a recommendation 20 with access to articles or information about improving time management or other self-help topics. As such, the information provided in the recommendations 20 may be tailored based on the insights 18 generated and may promote healthy device usage behaviors 14.

Another example insight 18 includes recommending applications or other content to the users 104a, 104b based on the device usage behaviors 14. The device model 12 may identify applications being used by the child and may automatically identify a trend among similar age children for downloading and using another application by looking at the aggregated device data 22 from other users 104a, 104b of the system 100. For example, the child may be using a learning application and the system may identify a trend among kids in the same region for downloading a Task Pet application that is a math application. The device model 12 may provide an insight 18 recommending the Task Pet application based on the identified application usage of the child and the identified trend in the area. The device model 12 may use the search data and existing usage data to factor into interest, relevance, propensity of acquiring additional applications.

The device model 12 may also provide a recommendation 20 with a direct link to the recommended application so that the user 104a, 104b may download or otherwise access the recommended application. If there are multiple versions of an application, the device model 12 may map out which version of the application is the best for this user or child based on the device usage behavior 14 (e.g., for a chess application, chess for kids may be the recommended application). In addition, the device model 12 may provide a filtered view of the user application reviews by more heavily weighing the reviews from other children and/or families that have similar usage patterns as the child.

Another example insight 18 includes identifying different life stages changes based on the device usage behaviors 14. For example, the device model 12 may determine that the child searching includes topics, such as, prom, acne, puberty, or sex. The device model 12 may provide an insight 18 indicating that the child is experiencing a life stage change based on the searching performed by the child. The device model 12 may also provide recommendations 20 with guidance for the different life stages changes based on the insight 18 provided. For example, the recommendations 20 may include information on approaching children on topics in various life stages changes based on the changes in device usage behavior 14.

As such, the device model 12 may generate any number of insights 18 and/or recommendations 20 based on the learned device usage behaviors 14 of the users 104a, 104b. The insights 18 and/or recommendations 20 may be provided in a user-friendly manner that is easy to understand.

In some implementations, the machine learning system 30 of the server 106 may include an inference model 36 that determines the device usage behaviors 14 of the users 104a, 104b and generates the insights 18 and/or the recommendations 20 based on the device usage behaviors 14. The inference model 36 may receive the device data 10, or the modified device data 16, from the user devices 102a, 102b. If the inference model 36 receives the device data 10, the device data 10 may be abstracted to preserve the data privacy of the user without any user identifying information in the device data 10. The inference model 36 may receive the aggregated device data 22 and may compare the device data 10 or the modified device data 16 to the aggregated device data 22 to generate the insights 18 and/or recommendations 20. The insights 18 and/or recommendations 20 may be transmitted to corresponding user device 102a, 102b.

The user devices 102a, 102b may include a device activity reporting platform 26 that may receive or otherwise access the insights 18 and/or recommendations 20 generated by the device model 12. The device activity reporting platform 26 may include a user interface 28 that may be displayed on one or more displays in communication with the user devices 102a, 102b. The user interface 28 may present the insights 18 and/or the recommendations 20 to the users 104a, 104b.

The users 104a, 104b may access the device activity reporting platform 26 to receive information on device usage by the users 104a, 104b. The user interface 28 may present insights 18 and/or recommendations 20 determined by the device module 12 on the user device 102a, 102b of the user 104a, 104b.

The users 104a, 104b may also access the device activity reporting platform 26 to monitor other users' device usage. In some implementations, the user 104a is a parent accessing the device activity reporting platform 26 to monitor the device usage of their child (e.g., user 104b). For example, the device activity reporting platform 26 may present on the user interface 28 of the parent's device the insights 18 and/or recommendations 20 determined by the device model 12 of the child's device.

The user interface 28 may provide easy access to the recommended actions or provided content based on the insights 18. In addition, the user interface 28 may allow the users 104a, 104b to automatically subscribe to the recommended action using, for example, a one-click access by selecting a link or icon. For example, if the user 104a, 104b selected the pause screen time action for a selected time period, the device activity reporting platform 26 may automatically prevent access to the user devices 102a, 102b during the identified time period.

The system 100 may have multiple machine learning models running simultaneously. For example, one or more of the device model 12, the training model 32, and/or the inference model 36 may run concurrently. In some implementations, one or more computing devices (e.g., servers 106 and/or user devices 102a, 102b) are used to perform the processing of system 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the device models 12 may be implemented by multiple user devices 102a, 102b. Another example includes the training model 32 and/or the inference model 36 implemented wholly on the same server 106 device. Another example includes one or more subcomponents of the training model 32 and/or the inference model 36 implemented across multiple server 106 devices. Moreover, in some implementations, the training model 32 and/or the inference model 36 may be implemented and processed on different server 106 devices of the same or different cloud computing networks.

In some implementations, each of the components of the system 100 is in communication with each other using any suitable communication technologies. In addition, while the components of the system 100 are shown to be separate, any of the components or subcomponents may be combined into fewer components, such as into a single component, or divided into more components as may serve a particular embodiment. In some implementations, the components of the system 100 include hardware, software, or both. For example, the components of the system 100 may include one or more instructions stored on a computer-readable storage medium and executable by processors of one or more computing devices. When executed by the one or more processors, the computer-executable instructions of one or more computing devices can perform one or more methods described herein. In some implementations, the components of the system 100 include hardware, such as a special purpose processing device to perform a certain function or group of functions. In some implementations, the components of the system 100 include a combination of computer-executable instructions and hardware.

As such, the system 100 may be used to compile the device data 10 and/or the aggregated device data 22 of multiple users of the system 100 to provide relatable insights 18 and actionable recommendations 20 to the users 104a, 104b of the system 100. Moreover, by distributing the compute to the user devices 102a, 102b, the system 100 may maintain data privacy the users 104a, 104b by using the device models 12 to determine the device usage behaviors 14, the insights 18, and/or the recommendations 20 on the user devices 102a, 102b without having the device data 10 leave the user devices 102a, 102b.

Figure 2:
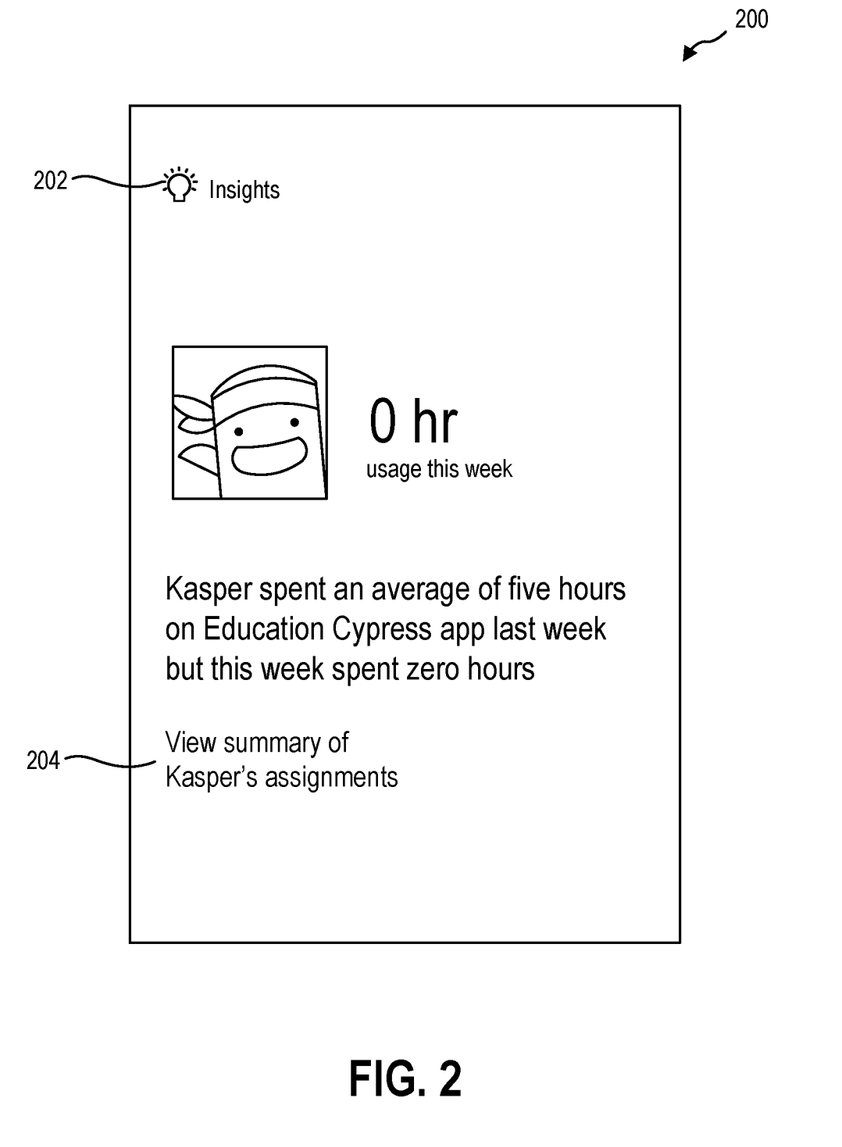
FIG. 2 illustrates an example graphical user interface screen with an example insight for a detected abnormality in device usage behavior and a recommended action in accordance with implementations of the present disclosure.

Referring now to FIG. 2, illustrated is an example graphical user interface (GUI) screen 200 that presents an insight 202 generated by the device model 12 (FIG. 1) for a detected abnormality in device usage behavior 14 (FIG. 1) of a child. The GUI screen 200 may be presented on a display of a user device 102a, 102b (FIG. 1) in response to the user 104a, 104b (FIG. 1) accessing the device activity reporting platform 26 (FIG. 1). In addition, the GUI screen 200 may be presented automatically in response to the device model 12 identifying a change in the device usage behavior 14 of the child.

The insight 202 may provide information about changes in educational usage of the user device 102a, 102b by a child (e.g., educational application usage, completing educational tasks or assignments, viewing educational videos, etc.) and/or may determine reasons for the change in the educational usage of the user device 102a, 102b by the child. For example, the insight 202 may indicate that the child, Kasper, spent an average of five hours on an educational application (Education Cypress) last week but this week there was zero activity on the educational application. The insight 202 may be based on an aggregation of the child's usage of educational applications over the past few weeks recorded by the device model 12.

The insight 202 may be presented on the GUI screen 200 using a combination of text, images, and/or statistics. For example, text may explain the normal device usage behavior and the detected abnormality in the device usage behavior 14. In addition, images and/or statistics may also be used to illustrate the detected abnormality in the device usage behavior. As such, the insight 202 may be presented in a user-friendly manner so that the user 104a, 104b may easily identify the normal device usage behavior 14 for the child and easily identify the detected abnormality in device usage behavior by the child.

The insight 202 may be associated with one or more recommended actions 204 for the detected abnormality. The GUI screen 200 may present the recommended action 204 to the user 104a, 104b. In addition, the GUI screen 200 may provide a link or other access to the recommended action 204 that the user 104a, 104b may select.

For example, the recommended action 204 includes viewing a summary of the child's school assignments. The user 104a, 104b may access the child's school assignments by clicking the link provided on the GUI screen 200. With one-click, the user 104a, 104b may easily view a summary of the child's completed school assignments and any outstanding school assignments detected by the device model 12. As such, the user 104a, 104b may be provided with an overview of the child's assignments and may determine if the detected change in educational application usage may be affecting the child's schoolwork.

Figure 3:
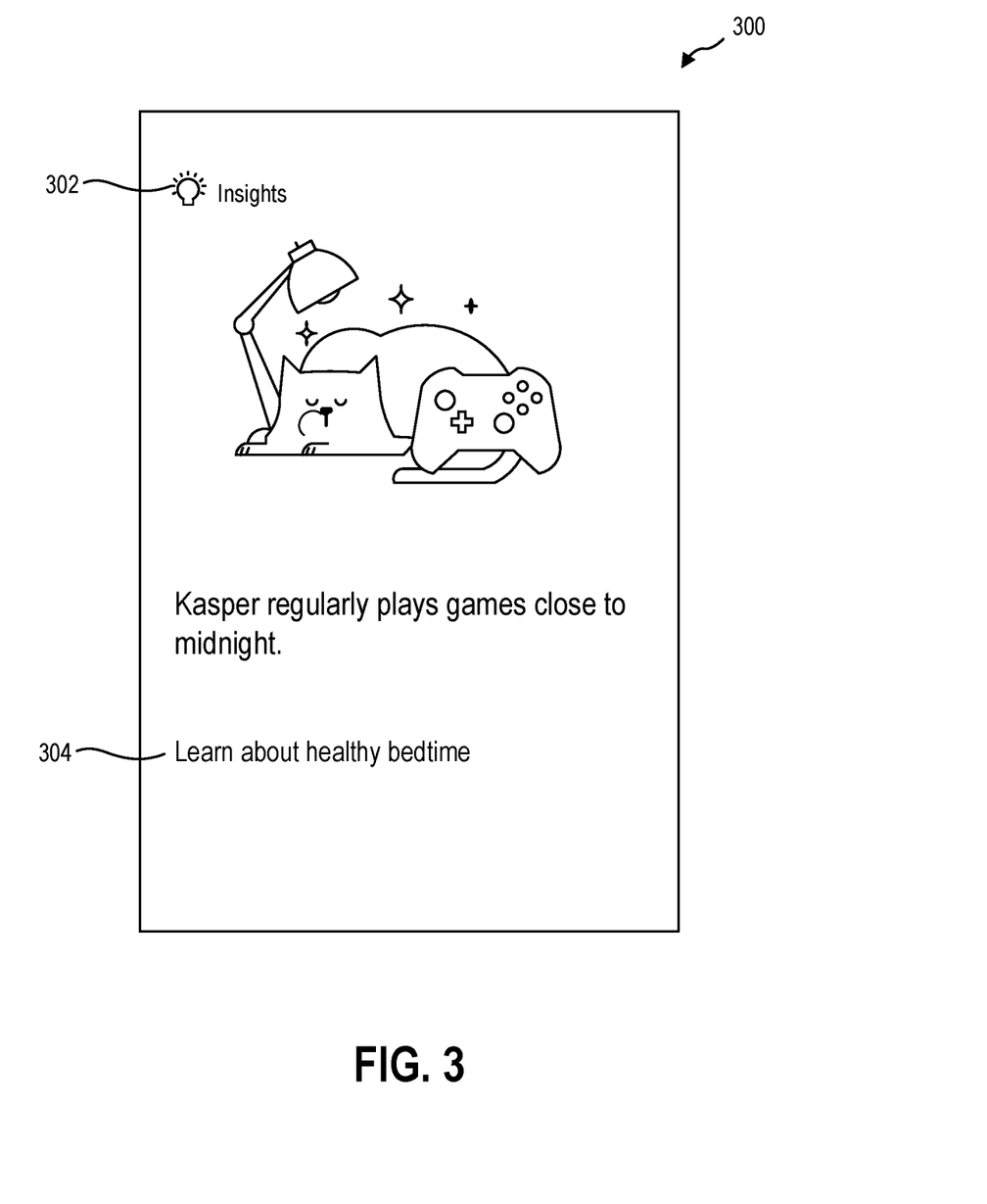
FIG. 3 illustrates an example graphical user interface screen with an example insight for device usage behavior and a recommended action in accordance with implementations of the present disclosure.

Referring now to FIG. 3, illustrated is an example GUI screen 300 that presents an insight 302 generated by the device model 12 (FIG. 1) for an unhealthy device usage habit. The GUI screen 300 may be presented on a display of a user device 102a, 102b (FIG. 1) in response to the user 104a, 104b (FIG. 1) accessing the device activity reporting platform 26 (FIG. 1) or automatically in response to the device model 12 identifying the device usage behavior 14 of the child.

The insight 302 may indicate an unhealthy device usage habit of consistently playing games close to midnight. The insight 302 may be presented on the GUI screen 300 using a combination of text and images. The images may illustrate the insight in a user-friendly manner (e.g., an image of a game console and nighttime) so that the user 104a, 104b may easily understand the unhealth device usage habit identified by the insight 302. In addition, the text may explain the detected unhealthy device usage habit of the child (e.g., Kasper regularly plays a game close to midnight).

The GUI screen 300 may present one or more recommended actions 304 associated with the insight 302. In addition, the GUI screen 300 may provide access to the one or more recommended actions 304 (e.g., by clicking a link or icon on the GUI screen 300). For example, the recommended action 304 may be a link to learn more about healthy bedtime routines. When the user selects the recommended action 304 one or more articles may be presented on the GUI screen 300 on benefits to healthy bedtime routines or strong bedtime routines. The articles may be selected based on the detected device usage behavior 14 of the child and may be selected from respected sources (e.g., health organizations, news organizations, etc.). As such, the user 104a, 104b may easily access a set of curated articles from respected sources providing advice or suggestions to improve the unhealthy device usage habit or promote healthy device usage habits using GUI screen 300.

Figure 4:
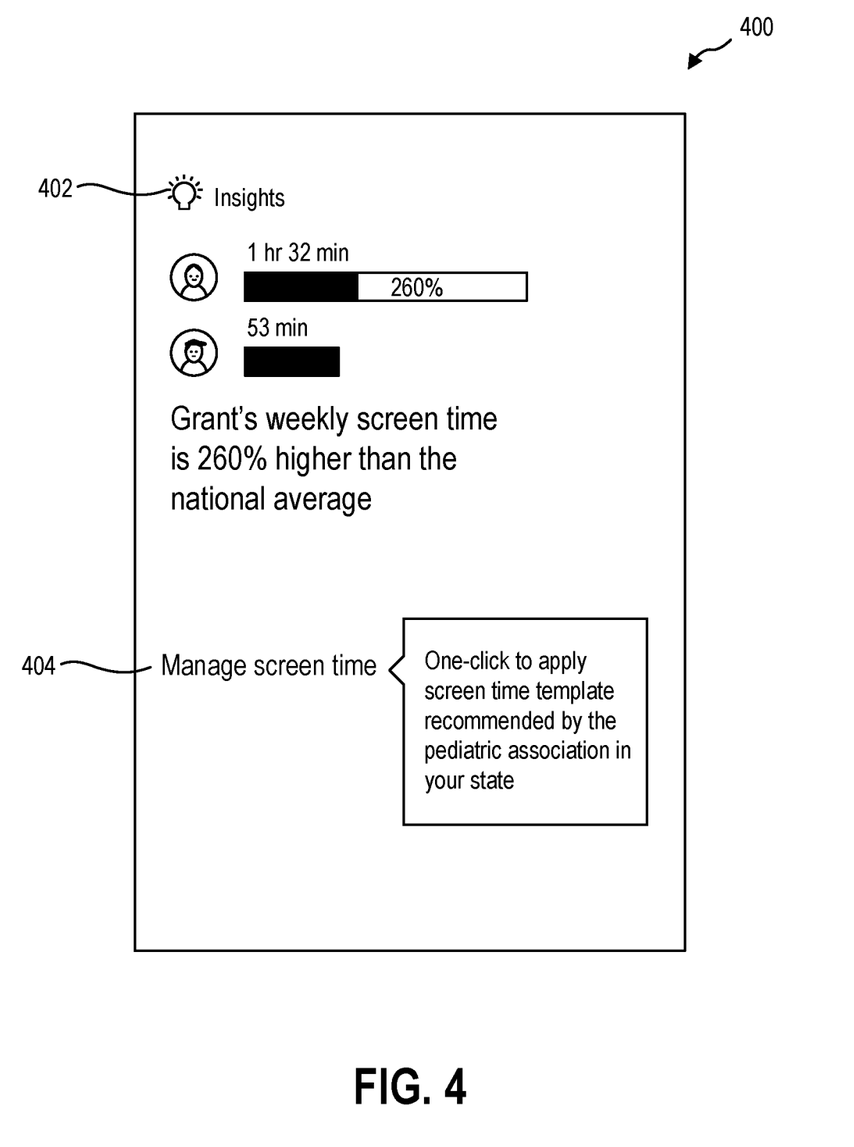
FIG. 4 illustrates an example graphical user interface screen with an example insight for device usage behavior and a recommended action for managing screen time in accordance with implementations of the present disclosure.

Referring now to FIG. 4, illustrated is an example GUI screen 400 that presents an insight 402 generated by device model 12 (FIG. 1) for a device usage behavior 14 (FIG. 1) of a child identified by the device model 12. The insight 402 may indicate that the child's weekly screen time usage of the device exceeds a threshold level. For example, the insight 402 indicates that the child screen time usage is 260% higher than the national average.

The GUI screen 400 may be presented on a display of a user device 102a, 102b (FIG. 1) in response to the user 104a, 104b accessing the device activity reporting platform 26 (FIG. 1) or automatically in response to the device model 12 identifying that the device usage behavior 14 of the child exceeds a threshold level.

The insight 402 may be presented using a combination of graphs, statistics, and/or text. For example, a graph may be used to compare the child's screen usage time to a national average screen usage time. In addition, statistics may be used to show whether the child's screen usage time exceeds the national average or is below the national average. As such, a user may view the graphs to easily make a comparison of the child's screen usage time compared to a benchmark group (national average, average of children at the same school, average of children in the same city, etc.). The text may explain the insight 402 and the statistics illustrated in the graphs.

The GUI screen 400 may present one or more recommended actions 404 for the provided insights 402. In addition, the GUI screen 400 may provide access to the one or more recommended actions 404 (e.g., by clicking a link or icon on the GUI screen 400). For example, the recommended action 404 may be managing screen time usage of the child's device. The GUI screen 400 may also provide additional information about the recommended action 404. For example, the additional information may explain that by clicking the link for the recommended action 404 a screen time template recommended by the pediatric association in your state may be automatically applied to the child's device. The device activity reporting platform 26 may automatically apply the screen time template in response to the user selecting the recommended action 404 to regulate the screen time on the child's device based on the recommended amount of screen time by the pediatric association. As such, the GUI screen 400 provides access to recommended actions 404 to the users 104a, 104b based on the provided insight 402.

Figure 5:
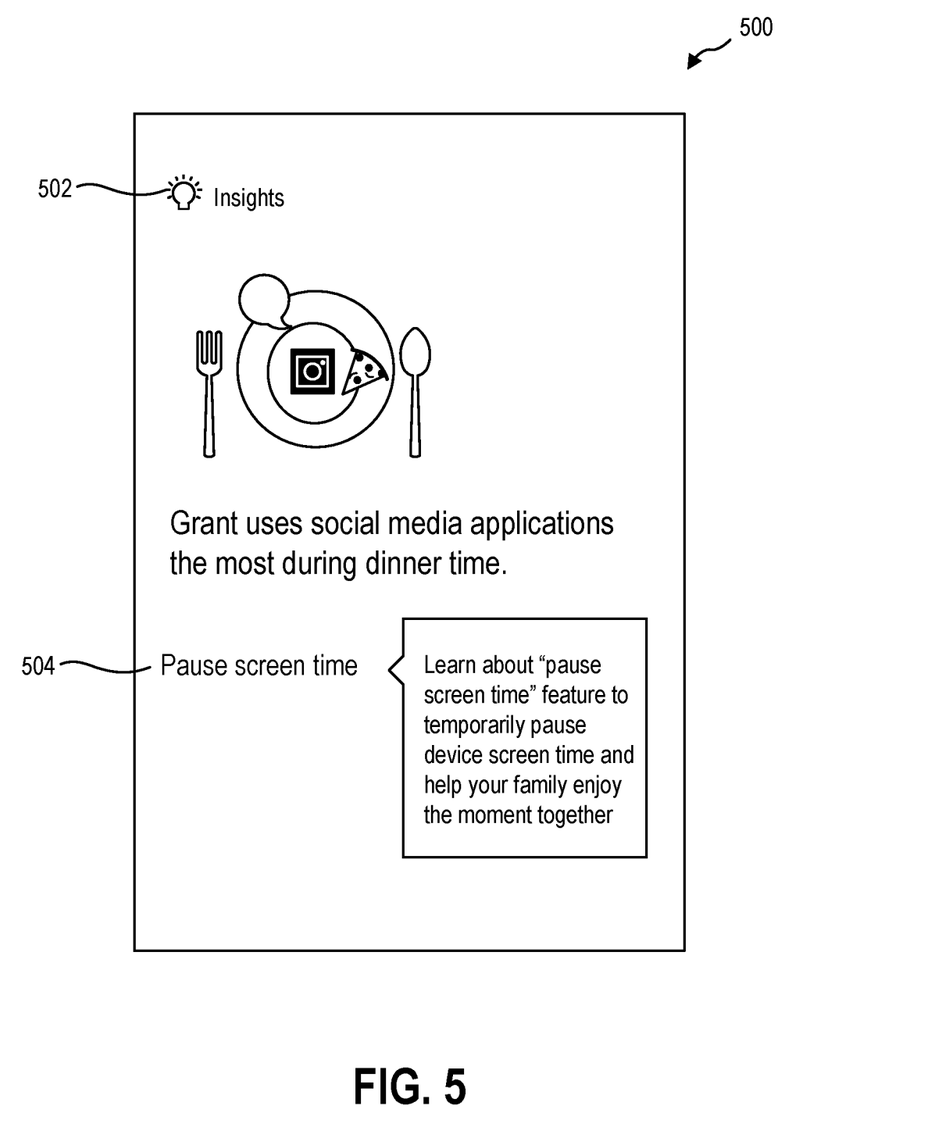
FIG. 5 illustrates an example graphical user interface screen with an example insight for device usage behavior and a recommended action for pausing screen time in accordance with implementations of the present disclosure.

Referring now to FIG. 5, illustrated is an example GUI screen 500 that presents an insight 502 generated by the device model 12 (FIG. 1) for a device usage behavior 14 (FIG. 1) of a child. The GUI screen 500 may be presented on a display of a user device 102a, 102b (FIG. 1) in response to the user 104a, 104b (FIG. 1) accessing the device activity reporting platform 26 (FIG. 1) or automatically in response to the device model 12 identifying the insight 502.

The insight 502 may identify a pattern for the device usage behavior 14. For example, the insight 502 indicates that a child uses a social media application the most during dinner time. The device model 12 may automatically determine when dinnertime is for the child and may provide the insight 502 based on when dinner occurs for the child. The insight 502 may be presented on the GUI screen 500 using a combination of text and images. The images may illustrate the insight in a relatable manner (e.g., an image of a place setting or an image of a meal) so that the user 104a, 104b may easily understand the insight 502. In addition, the text may explain the detected device usage behavior 14 of the child.

The GUI screen 500 may present one or more recommended actions 504 for the provided insights 502. In addition, the GUI screen 500 may provide access to the one or more recommended actions 504 (e.g., by clicking a link or icon on the GUI screen 500). For example, the recommended action 504 is pausing screen time usage of the child's device during dinnertime. The GUI screen 500 may also provide additional information about the recommended actions 504. For example, the additional information may explain that by clicking the link for the recommended action 504 a user may learn more about a pause screen time feature to temporality pause access to a device allowing your family to enjoy the moment together. The device activity reporting platform 26 may apply the pause screen time feature for the determined dinnertime period in response to the user selecting the recommended action 504 to temporarily prevent access to the device and pause the screen time on the child's device during the dinnertime period. As such, the GUI screen 500 provides actional recommendations to the users 104a, 104b based on the provided insight 502.

Figure 6:
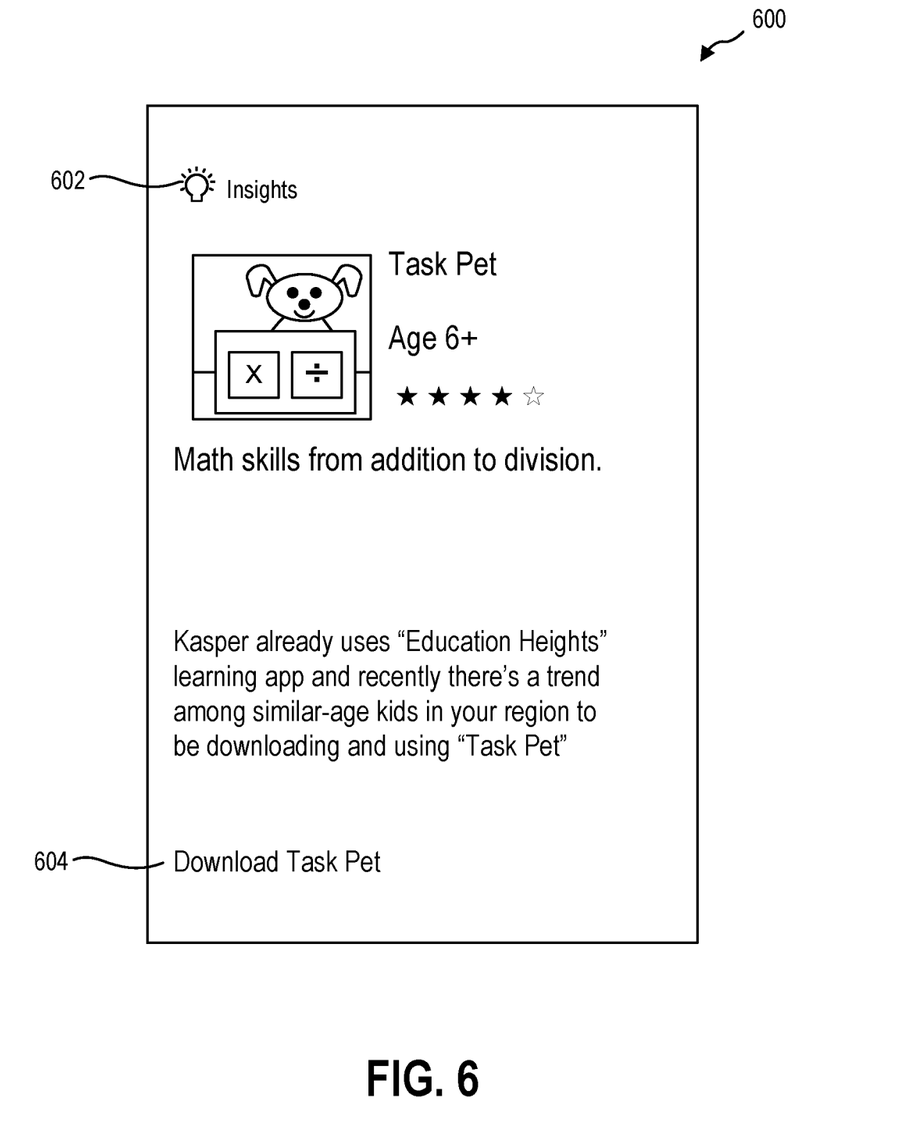
FIG. 6 illustrates an example graphical user interface screen with an example insight for device usage behavior and a recommended action for downloading an application in accordance with implementations of the present disclosure.

Referring now to FIG. 6, illustrated is an example GUI screen 600 that presents an insight 602 generated by the device model 12 (FIG. 1) for a device usage behavior 14 (FIG. 1) of a child. The GUI screen 600 may be presented on a display of a user device 102a, 102b (FIG. 1) in response to the user 104a, 104b (FIG. 1) accessing the device activity reporting platform 26 (FIG. 1) or automatically in response to the device model 12 identifying the insight 602.

The insight 602 may include determining that the child already uses a learning application and a recent trend among similar-aged children in the user's region downloaded a math related application "Task Pet." The insight 602 may be presented using a combination of images, ratings, and/or text. The images may be of the application and the ratings may indicate the reviews of the application. The text may indicate information about the application. In addition, the text may describe the insight 602 in a relatable manner so that the user may easily understand what is recommended.

The GUI screen 600 may present one or more recommended actions 604 associated with the insight 602. In addition, the GUI screen 600 may provide access to the one or more recommended actions 604 (e.g., by clicking a link or icon on the GUI screen 400). For example, the recommended action 604 may be a link to download the recommended application. If there are multiple versions of an application, the device model 12 (FIG. 1) may map out which version of the application is the best for this user or child based on the device usage behavior 14. As such, the application presented on the GUI screen 600 may be a version of the application selected for this user. In addition, the device model 12 may provide a filtered view of the user application reviews by more heavily weighing the reviews from other children/families that have similar usage patterns as the child.

When the user selects the recommended action 604, the application may automatically download to the child's device, or the user may be directly taken to the application in an application store so that the user may proceed with downloading the application to the device. As such, the GUI screen 600 may provide an actionable recommendation to the user for the insight 602.

Figure 7:
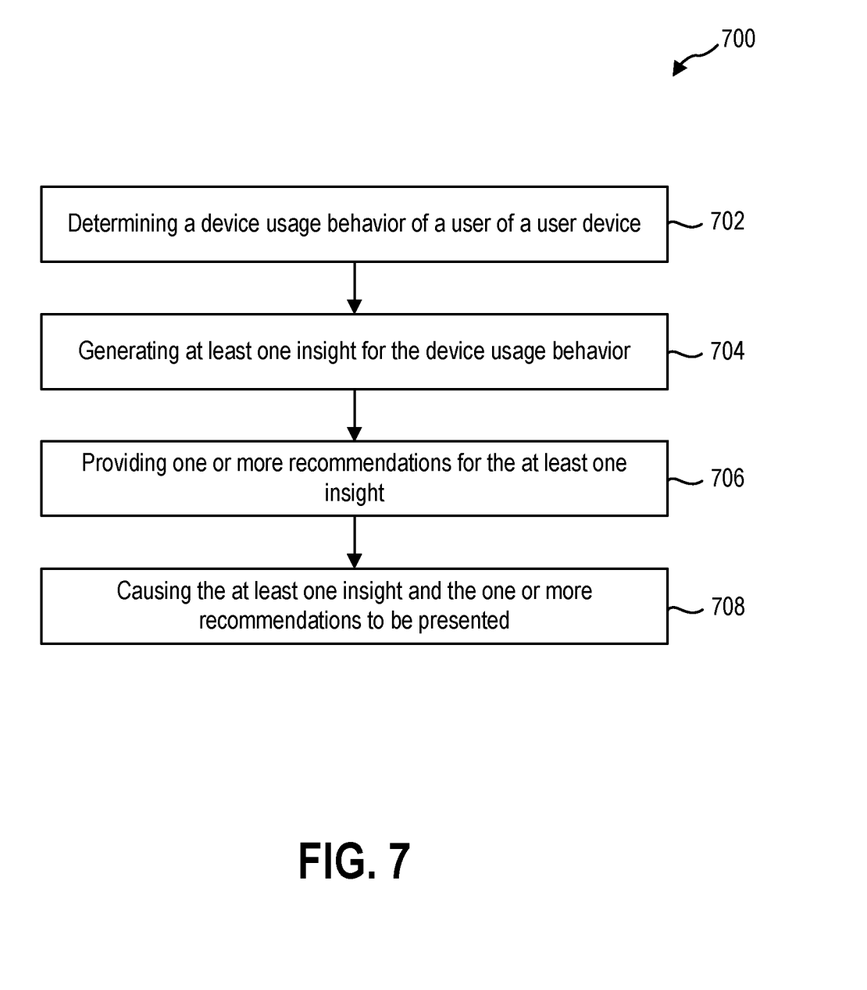
FIG. 7 illustrates an example method for providing insights and recommendations for device usage behaviors in accordance with implementations of the present disclosure.

Referring now to FIG. 7, illustrated is an example method 700 performed by one or more computing devices (e.g., user devices 102a, 102b, server 106) of system 100 (FIG. 1) for providing one or more insights 18 (FIG. 1) and/or recommendations 20 (FIG. 1) based on device usage behavior 14 (FIG. 1) of users 104a, 104b (FIG. 1) of the system 100. Method 700 may be implemented by the device model 12 (FIG. 1) on the user devices 102a, 102b. Method 700 may also be implemented by the machine learning system 30 (FIG. 1) of the server 106 (FIG. 1). The actions of method 700 are discussed below with reference to the architecture of FIG. 1.

At 702, method 700 includes determining a device usage behavior of a user of a user device. The device model 12 accesses the device data 10 and may determine device usage behaviors 14 for the users 104a, 104b. The device usage behaviors 14 may indicate device usage trends, device usage habits, and/or device usage patterns of the users 104a, 104b. The device model 12 may be a trained machine learning model provided to the user devices 102a, 102b by the server 106. The server 106 may include a training model 32 that trains the device models 12 and provides the device models 12 to the user devices 102a, 102b. In some implementations, the inference model 36 on the server 106 may access the device data 10 and/or modified device data 16 received from the user devices 102a, 102b and may determine the device usage behaviors 14 for the users 104a, 104b.

At 704, method 700 includes generating at least one insight for the device usage behavior. The device model 12 may generate one or more insights 18 for the device usage behaviors 14. The insights 18 may present highlights or summaries of the device usage behaviors 14 in a relatable manner so that the users 104a, 104b may easily identify the device usage behaviors 14 and/or easily digest information from the device usage behaviors 14. The insights 18 may highlight device usage behaviors 14 that are possibly problematic. The insights 18 may also identify new device usage behaviors 14. The insights 18 may also highlight abnormalities or deviations from typical device usage behaviors 14. In addition, the insights 18 may identify patterns in the device usage behaviors 14. In some implementations, the inference model 36 on the server 106 may generate the insights 18, or a portion of the insights 18, and may send the insights 18 to the user devices 102a, 102b.

The device model 12 may receive aggregated device data 22 from the server 106 to use in making the insights 18 and/or the recommendations 20. The aggregated device data 22 may be device data received at the server 106 from other users of the system 100 that is typically inaccessible to the users 104a, 104b. The server 106 may maintain the data privacy of the users 104a, 104b of the system 100 by providing the aggregated data 22 without any user identification information. The device model 12 may process the aggregated device data 22 data and compare the device usage behaviors 14 to the aggregated device data 22 to provide meaningful insights 18 put in user-friendly terms.

The device model 12 may receive additional content 24 from the server 106 to use in making the insights 18. The additional content 24 may include, but is not limited to, articles, videos, webpages, and/or vendor information. The additional content 24 may be a curated set or subset of information or content that is relevant to the device usage behaviors 14. The device model 12 may process the additional content 24 and compare the device usage behaviors 14 to the additional content 24 to provide the insights 18.

At 706, method 700 includes providing one or more recommendations for the at least one insight. The device model 12 may generate one or more recommendations 20 for the device usage behaviors 14. The recommendations 20 may provide an action for the users 104a, 104b to take based on the insights 18. The recommendations 20 may also provide additional information to the users 104a, 104b related to the insights 18. The recommendations 20 provided may be for improving a behavior (e.g., improving game play or spending more time outside instead of playing games). The recommendations 20 provided may promote healthy device usage habits. The recommendations 20 provided may also be for enforcement or restrictions (e.g., actions to take to prevent screen time access or reduce screen time access). The recommendations 20 and/or suggested actions may differ based on the insights 18 generated. In some implementations, the inference model 36 on the server 106 may generate the recommendations 20, or a portion of the recommendations 20, and may send the insights 18 to the user devices 102a, 102b.

The device model 12 may process the aggregated device data 22 data and compare the device usage behaviors 14 to the aggregated device data 22 to provide recommendations 20. In addition, the device model 12 may receive additional content 24 from the server 106 to use in making the recommendations 20. The device model 12 may process the additional content 24 and compare the device usage behaviors 14 to the additional content 24 to identify relevant content to provide in the recommendations 20. The relevant content may be based on similarities identified in the additional content 24 and the device usage behaviors 14.

At 708, method 700 includes causing the at least one insight and the one or more recommendations to be presented. The device model 12 may transmit the insights 18 and/or the recommendations 20 to a device activity reporting platform 26 on the user devices 102a, 102b. The device activity reporting platform 26 may include a user interface 28 that may be displayed on one or more displays in communication with the user devices 102a, 102b. The user interface 28 may present the insights 18 and/or the recommendations 20 to the users 104a, 104b in a user-friendly manner so that the users 104a, 104b may easily identify the insights 18 and/or the recommendations 20. In addition, the user interface 28 may provide access to the one or more recommendations 20 by clicking a link or icon on the user interface 28.

The users 104a, 104b may access the device activity reporting platform 26 to receive information on device usage by the users 104a, 104b. The user interface 28 may present insights 18 and/or recommendations 20 determined by the device module 12. The users 104a, 104b may also access the device activity reporting platform 26 to monitor other users' device usage. In some implementations, the user 104a is a parent accessing the device activity reporting platform 26 to monitor the device usage of their child, user 104b. For example, the device activity reporting platform 26 may present on the user interface 28 of the parent's device the insights 18 and/or recommendations 20 determined by the device model 12 of the child's device.

As such, method 700 may be used to provide any number of insights 18 and/or recommendations 20 based on the learned device usage behaviors 14 for device usage of the users 104a, 104b.

As illustrated in the foregoing discussion, the present disclosure utilizes a variety of terms to describe features and advantages of the present disclosure. Additional detail is now provided regarding the meaning of such terms. For example, as used herein, a "machine learning model" refers to a computer algorithm or model (e.g., a classification model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method implemented by a user device, comprising:
using a machine learning model to determine a device usage behavior of a user of the user device based on received device data of the user device, wherein the device usage behavior indicates device usage habits or device usage patterns of the user;
generating, by the machine learning model, at least one insight for the device usage behavior that indicates a healthy device usage habit of the user or an unhealthy device usage habit of the user, wherein the user is a child and the unhealthy device usage habit is one or more of regular device usage late at night, playing games for a long period of time, or screen time usage above a threshold level;
providing one or more recommendations for the at least one insight to promote healthy device usage behavior; and
automatically preventing access to the user device for a determined time period in response to the one or more recommendations indicating an unhealthy device usage habit of the user.

2. The method of claim 1, wherein the one or more recommendations further include access to a curated set of information providing advice or suggestions related to the device usage behavior.

3. The method of claim 2, wherein the curated set of information includes one or more articles automatically identified by the machine learning model for improving the device usage behavior based on similarities identified in the one or more articles to the device usage behavior.

4. The method of claim 1, wherein the healthy device usage habit of the user or the unhealthy device usage habit of the user is determined by comparing the device usage behavior to a threshold level.

5. The method of claim 4, wherein the threshold level is determined based on a geographic region for the user.

6. The method of claim 4, wherein the threshold level is determined based on comparing the device usage behavior to device usage of other users with a similar demographic to the user.

7. The method of claim 1, wherein the machine learning model is trained by a server in communication with the user device and provided to the user device from the server to run on the user device.

8. A method implemented by a user device, comprising:
using a machine learning model to determine a device usage behavior of a user of the user device based on received device data, wherein the device usage behavior indicates device usage habits or device usage patterns of the user;
generating, by the machine learning model, at least one insight for the device usage behavior that indicates an abnormality in the device usage behavior of the user relating to educational usage of the user device, wherein the machine learning model handles seasonality exceptions or location-based exceptions of the user device in determining whether the abnormality in the device usage behavior occurred;
providing one or more recommendations for the at least one insight, wherein the one or more recommendations include an action based on the at least one insight; and
automatically providing access to a summary of educational assignments assigned to the user including past due assignments or upcoming assignments in response to the at least one insight.

9. The method of claim 8, wherein the at least one insight for the device usage behavior indicates detected usage swapping by the user from the education usage of the user device to entertainment usage of the user device and provides a reason for the usage swapping.

10. The method of claim 9, wherein the reason is distraction or disengagement of a class or class assignment.

11. The method of claim 8, wherein the machine learning model is trained by a server in communication with the user device and provided to the user device from the server to run on the user device.

12. A system, comprising:
one or more processors;
memory in electronic communication with the one or more processors; and
instructions stored in the memory, the instructions executable by the one or more processors to:
train, at a server, a device model using federated learning to aggregate device data received from a plurality of user devices in the system; and
provide the device model to the plurality of user devices, wherein each device model operating on a user device of the plurality of user devices is operable to:
determine a device usage behavior of a user of the user device based on the device data of the user device, wherein the device usage behavior indicates device usage habits or device usage patterns of the user;
generate at least one insight for the device usage behaviors wherein the at least one insight includes regularly using the device during a mealtime;
provide one or more recommendations for the at least one insight; and
automatically prevent access to the user device during the mealtime in response to the one or more recommendations indicating an unhealthy device usage habit of the user during the mealtime.

13. The system of claim 12, wherein the device usage behavior is an amount of screen time for the user and the at least one insight includes a comparison of the screen time to an average or threshold level.

14. The system of claim 12, wherein the at least one insight includes a detected abnormality in the device usage behavior, a healthy device usage habit, or an unhealthy device usage habit.

15. The system of claim 12, wherein the at least one insight includes a recommended application or content based on the device usage behavior and the one or more recommendations include a direct link to download the application or content to the user device.

16. The system of claim 12, wherein the at least on insight includes identifying a life stage change for the user based on the device usage behavior and the one or more recommendations include access to information for how to discuss the life stage change.

* * * * *